United States Patent
Giessauf et al.

(10) Patent No.: US 10,183,429 B2
(45) Date of Patent: Jan. 22, 2019

(54) METHOD AND DEVICE FOR THE PRODUCTION OF AN INJECTION-MOULDED PART

(71) Applicant: ENGEL AUSTRIA GmbH, Schwertberg (AT)

(72) Inventors: Josef Giessauf, Perg (AT); Christian Maier, Linz (AT)

(73) Assignee: Engel Austria GmbH, Schwertberg (AT)

( * ) Notice: Subject to any disclaimer, the term of this patent is extended or adjusted under 35 U.S.C. 154(b) by 345 days.

(21) Appl. No.: 14/243,341

(22) Filed: Apr. 2, 2014

(65) Prior Publication Data

US 2014/0332991 A1 Nov. 13, 2014

(30) Foreign Application Priority Data

Apr. 2, 2013 (AT) .................................. A 238/2013

(51) Int. Cl.
*B29C 45/16* (2006.01)
*B29C 45/72* (2006.01)
*B29L 11/00* (2006.01)
*B29C 45/26* (2006.01)
*B29C 45/00* (2006.01)

(52) U.S. Cl.
CPC ...... *B29C 45/1618* (2013.01); *B29C 45/1642* (2013.01); *B29C 45/7207* (2013.01); *B29C 2045/0043* (2013.01); *B29C 2045/1621* (2013.01); *B29C 2045/2683* (2013.01); *B29C 2045/7214* (2013.01); *B29L 2011/0016* (2013.01)

(58) Field of Classification Search
CPC .... B29C 2045/7214; B29C 2045/1626; B29C 45/1618; B29C 45/7207; B29C 45/72; B29C 45/16; B29C 45/1615; B29C 45/162; B29C 45/1642; B29L 2011/0016
USPC ......... 264/1.7, 328, 250, 254, 255, 259, 266
See application file for complete search history.

(56) References Cited

U.S. PATENT DOCUMENTS 3,878,282 A * 4/1975 Bonis .................. B29C 45/1625
                                                                                                   215/12.2
4,734,023 A     3/1988 Nesch et al.
(Continued)

FOREIGN PATENT DOCUMENTS

| AT | 505321 | 12/2008 |
|---|---|---|
| CN | 1950186 | 4/2007 |

(Continued)

OTHER PUBLICATIONS

Chinese Search Report dated Jan. 18, 2016 in corresponding Chinese Application No. 201410331919.9.
(Continued)

*Primary Examiner* — Philip C Tucker
*Assistant Examiner* — Jimmy R Smith, Jr.
(74) *Attorney, Agent, or Firm* — Wenderoth, Lind & Ponack, L.L.P.

(57) ABSTRACT

A method for the production of an injection-molded part including casting an injection-molding material at least two injection-molding stations by at least two injection-molding processes. A pre-molded part, produced in one of the at least two injection-molding processes, is cooled in a cooling station between the at least two injection-molding processes.

21 Claims, 15 Drawing Sheets

(56) References Cited

U.S. PATENT DOCUMENTS

| | | | |
|---|---|---|---|
| 4,874,654 A | 10/1989 | Funaki et al. | |
| 5,753,151 A | 5/1998 | McBride | |
| 6,210,619 B1 | 4/2001 | Owens | |
| 2003/0170339 A1 | 9/2003 | Ebner et al. | |
| 2006/0244178 A1 | 11/2006 | Armbruster | |
| 2007/0096361 A1 | 5/2007 | Gram | |
| 2007/0194494 A1 | 8/2007 | Hartlmeier | |
| 2010/0013125 A1* | 1/2010 | Bock | B29C 35/16 264/348 |
| 2010/0276836 A1 | 11/2010 | Armbruster et al. | |
| 2010/0310697 A1 | 12/2010 | Steinebrunner et al. | |
| 2013/0265776 A1* | 10/2013 | Zollner | B29C 45/16 362/311.02 |

FOREIGN PATENT DOCUMENTS

| | | |
|---|---|---|
| CN | 101134357 | 3/2008 |
| CN | 101844394 | 9/2010 |
| DE | 36 23 566 | 4/1987 |
| DE | 199 42 153 | 4/2000 |
| DE | 101 21 691 | 11/2002 |
| DE | 10 2005 052 418 | 5/2007 |
| DE | 10 2007 060 863 | 6/2009 |
| DE | 20 2013 007 748 | 11/2013 |
| EP | 0 671 251 | 9/1995 |
| EP | 0 894 604 | 2/1999 |
| EP | 1 666 225 | 6/2006 |
| EP | 1 738 890 | 1/2007 |
| EP | 1 785 255 | 5/2007 |
| EP | 2 191 951 | 6/2010 |
| EP | 2 258 531 | 12/2010 |
| EP | 2 402 140 | 1/2012 |
| JP | 2002-79543 | 3/2002 |
| JP | 2006-62359 | 3/2006 |
| JP | 2008-80670 | 4/2008 |
| WO | 2007/082394 | 7/2007 |
| WO | 2012/069590 | 5/2012 |
| WO | WO 2012069590 A1 * | 5/2012 ............. B29C 45/16 |

OTHER PUBLICATIONS

International Search Report (ISR) dated Aug. 13, 2014 in International (PCT) Application No. PCT/AT2014/000067, together with English translation thereof.

Search Report dated Dec. 9, 2016 in corresponding Chinese Application No. 201410331919.9.

* cited by examiner

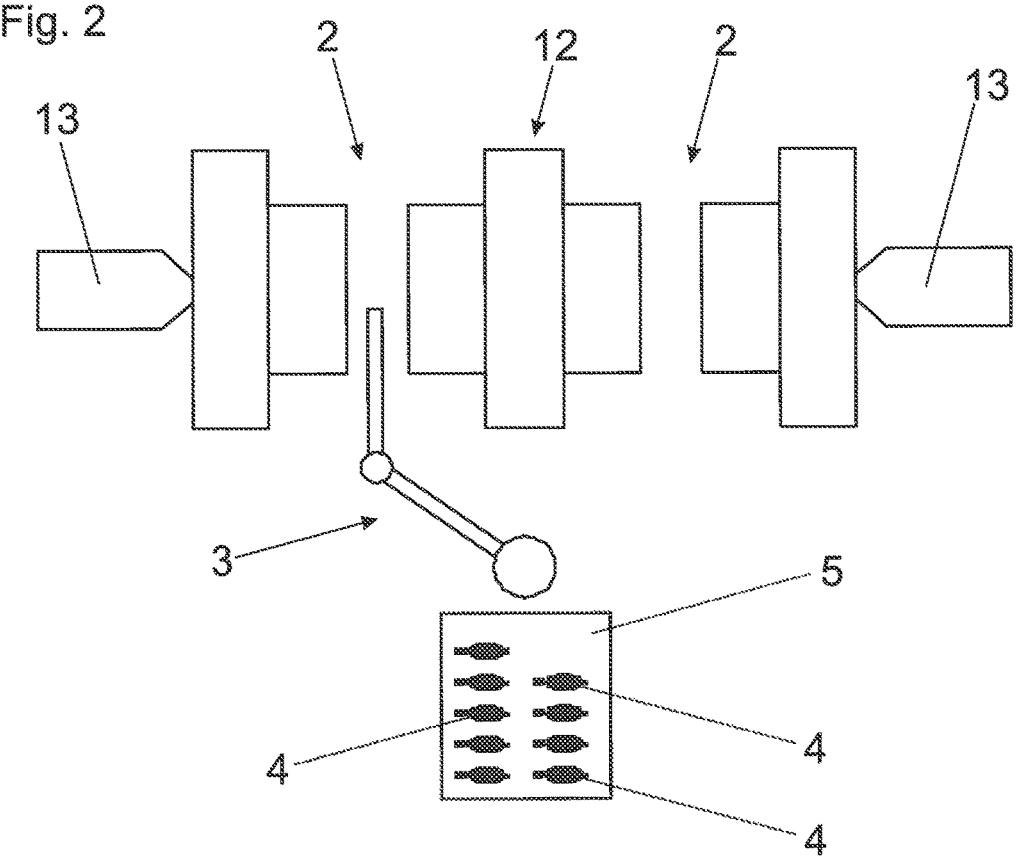

Fig. 8A
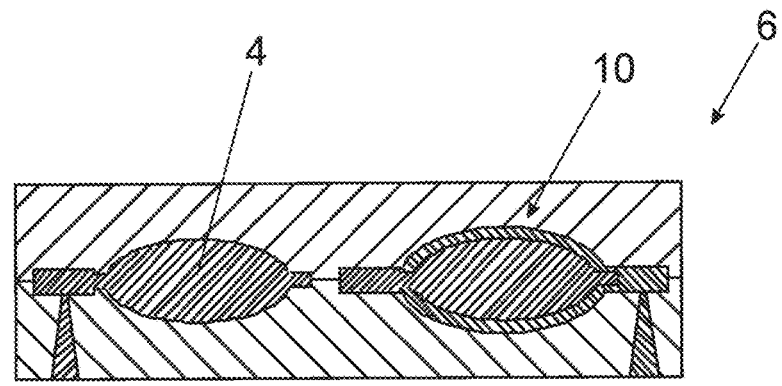
Fig. 8B
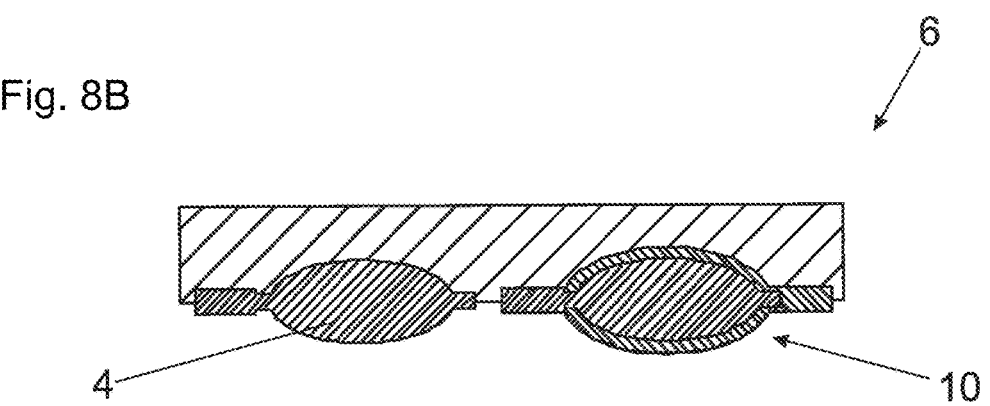

METHOD AND DEVICE FOR THE PRODUCTION OF AN INJECTION-MOULDED PART

BACKGROUND OF THE INVENTION

The present invention relates to a method for the production of an injection-moulded part as well as a device for the production of an injection-moulded part.

In particular when injection-moulding optical elements (for example lenses), it is known from the state of the art to inject-mould the injection-moulded parts to be produced in several layers or steps (for example from AT 505 321 A1). This has some advantages. For one thing, contour accuracy is improved by compensation of sink marks of a previously injection-moulded layer. Moreover, the pressure required to open the mould is reduced. Furthermore, the cycle time is shortened, because the cooling time increases, quadratically, with the wall thickness of the injection-moulded layer. This is shown, for example, in WO 2012/069590 A1. The sum of the cooling times in injection-moulding with several layers is thus less than in injection-moulding in one piece. This is shown in more detail below.

Generally, it can be assumed that the required cooling times are to be equal for all stations. This is advantageous especially if all the stations are arranged in a die or a machine.

The cooling time $t_k$ is proportional to the square of the wall thickness, thus $t_k = A \cdot s^2$ applies when using a factor of proportionality A.

In contrast to the inner layer, produced first, in the die outer layers are cooled only on one side. The cooling time of a layer cooled on one side is approximately equal to the cooling time of a layer cooled on both sides that is twice as thick. In order to achieve equal cooling times, an outer layer is thus permitted to have only half the wall thickness of the inner layer. Therefore, for an injection-moulded part made of three layers with the overall wall thickness s, in a first approximation a layer thickness distribution of $s_2 = \frac{1}{4}s$, $s_1 = \frac{1}{2}s$, $s_3 = \frac{1}{4}s$ is useful. ($s_2$, $s_3$ etc. denote the layer thicknesses of the outer layers, $s_1$ that of the inner layer. s denotes an overall thickness.)

Analogously, with an injection-moulded part of 2n+1 layers, the thickness of the first (inner) layer can be assumed to be $$\frac{1}{n+1},$$

and the thickness of all subsequent layers $$\frac{1}{2 \cdot (n+1)} \cdot n$$

is a natural number greater than or equal to 1, which indicates how often a pre-moulded part is subsequently overmoulded on both sides. The sum of the cooling times of the individual stations can be used to assess the cycle time saving. Although the individual cycle times can run in parallel, every station requires space in the die and in a machine—in conventional single-layer technology this space could have been used to accommodate further cavities.

Assuming that due to the cooling on one side the cooling time of the outer layers $s_2$ and $s_3$ corresponds to the cooling time of a layer that is twice as thick, the sum of the cooling times in a three-layer injection-moulded part is now $$t_{k,total} = t_{k1} + t_{k2} = A \cdot \left(\frac{s}{2}\right)^2 + A \cdot \left(\frac{2s}{4}\right)^2 = 2A \cdot \left(\frac{s}{2}\right)^2 = \frac{1}{2} A \cdot s^2,$$

wherein the cooling time of the layers $s_2$ and $s_3$ must be taken into account only once, as the cooling takes place at the same time and in the same station.

It is to be recognized that the total cooling time for the individual layers is only half the cooling time $t_k = A \cdot s^2$ of a single-layer injection-moulded part.

The following applies for n layers:

$$t_{k,total} = \frac{1}{n+1} \cdot A \cdot s^2$$

The total cooling time is now only the fraction 1/(n+1) of the cooling time of a single-layer injection-moulded part.

In addition to the obvious improvement in productivity, this reduced cycle time also has, for example, the advantage that the residence time of the material in the space in front of the screw is reduced.

In spite of this reduction in the cooling time, this still makes up a considerable proportion of the overall cycle time.

SUMMARY OF THE INVENTION

The object of the invention is to provide a method as well as a device which make possible a further reduced cycle time in the production of injection-moulded parts produced in several steps.

This occurs by cooling a pre-moulded part, produced in one of the at least two injection-moulding processes, in a cooling station between the at least two injection-moulding processes. This is because, during the time in which the pre-moulded part resides in the cooling station, further pre-moulded parts can already be produced in the relevant injection-moulding station. In other words, by cooling the pre-moulded parts outside the injection-moulding stations for longer, a reduction in the cycle time-relevant residence time of the pre-moulded parts in the injection-moulding stations is achieved. Thus, the invention is based on the surprising realization that even a very early demoulding of the pre-moulded parts does not impair the quality of the end-product.

The invention can in principle be applied to any injection-moulding material, thus any material which can be processed in an injection-moulding machine. Although for example metals, ceramic and even pharmaceutical active ingredients can also be processed in this way, in this document, for the sake of simplicity, reference is made to an injection-moulded part produced from a plasticized plastic, without this being understood to be limiting.

Within the meaning of the invention, it is not important after which injection-moulding process the cooling station is scheduled. Self-evidently, in the production of an injection-moulded part in more than two injection-moulding processes it is also possible to provide a cooling more than once in a cooling station.

A further aspect of the invention is that a first pre-moulded part, produced in a first of the at least two injection moulding processes, is cooled for a different, in particular longer, amount of time than a second pre-moulded part or injection moulded part produced in a successive, second of the at least two injection moulding processes. An effective cooling time, which consists of a cooling time in a cooling station and an amount of time, in which the pre-moulded part is still in the die but already cooling, can serve as a measure for the length of the cooling time In particular for thick-walled injection moulded parts a shorter cooling time can be effected through that, as cycle time relevant cooling times can be shortened. Under cycle time relevant cooling times such cooling times are understood, in which the pre-moulded part is disposed in the die and which therefore influence the cycle time directly.

Advantageous developments and embodiments of the invention are defined in the dependent claims.

The precise design of the cooling station is not important for the invention. The cooling station can, for example, be produced by the pre-moulded part being held by a handling robot, wherein the pre-moulded part cools in ambient air. An active cooling by a cooling medium in the cooling station can also be provided. It is also conceivable, for example, that the pre-moulded part is moved in a certain area and in this way is exposed to a cooling flow of air.

Preferably transparent plastics are processed in the production of optical elements. Examples are PC, PMMA, COC, COP and amorphous PA. The described invention can, however, also be used for other injection-moulded parts and materials. In particular, elastic materials, such as thermoplastic elastomers, can also be processed.

In a preferred embodiment, the device according to the invention is located in a clean room or a contamination-free area in order to prevent dust deposits on the pre-moulded parts.

In a further preferred embodiment, it is provided that an embossing tool is withdrawn in one half of the die, as a result of which an enlarged cavity is cleared for the subsequent overmoulding.

It can be provided that in the at least two injection-moulding processes the same plasticized plastic is processed, as a result of which, for example with optical elements, imaging errors are prevented. However, this is not strictly necessary. Naturally, optical elements or the like in which layers of different injection-mouldable materials are provided can also be produced.

In a preferred embodiment, the pre-moulded part is cooled for a whole-number multiple of a cycle time for the injection-moulding processes in the cooling station. Particularly preferably, further injection-moulding processes for further injection-moulded parts take place during the cooling in the cooling station.

With multiple injections it is not important for the invention whether metering takes place once or several times.

Injection-Moulded Parts, Layer Distribution

The invention can preferably be applied to thick-walled injection-moulded parts, for example optical lenses.

The invention can also preferably be applied to injection-moulded parts with large differences in wall thickness. If an injection-moulded part is sprayed in a more thin-walled area, it is often not possible, due to its more rapid solidification, to maintain the holding pressure over this thin-walled area for as long as would be required for the shrinkage compensation of the thick-walled area.

The thick-walled areas are produced at least partly in layers, one after the other. The chronological sequence of the layer production can be arranged such that a build-up takes place from inside to outside. Preferably the result is an odd number of layers—an inner pre-moulded part is overmoulded on both sides at least partly n times, resulting in a number of layers of 2n+1.

The first (inner layer in the finished part) must solidify in the die only to the extent that a trouble-free demoulding and a later insertion in a further cavity is possible. If it is now again assumed that the cooling times in the individual stations are to be equal, it is useful to assume that the wall thickness of the first layer—cooled on both sides—is now twice as large as the wall thickness of the subsequent layer. For a three-layer build-up of a moulded part with overall wall thickness s, the following layer distribution can be chosen accordingly: $s_2 < \frac{1}{4}s$, $s_1 > \frac{1}{2}s$, $s_3 < \frac{1}{4}s$.

Only the wall thicknesses of the outer layers are cycle time relevant, as the inner layer is cooled only partly (or not at all) in the injection-moulding area of a machine.

If, for example, with a three-layer build-up, a layer distribution of $s_2 = \frac{1}{8}s$, $s_1 = \frac{3}{4}s$, $s_3 = \frac{1}{8}s$ is chosen, the sum of the cooling times determining the cycle time is $$t_{k,total} = 2A \cdot \left(\frac{s}{4}\right)^2 = \frac{1}{8} A \cdot s^2.$$

Thus in this embodiment, compared with the single-layer injection-moulded part, only one eighth of the cooling time determining the cycle time is required; the remainder of the cooling takes place outside of the injection-moulding area.

More generally, this means that it is possible to reach a shortening of the cycle time relevant cooling times through the lengthening of non cycle time relevant cooling times.

Required Dies, Cavities, Machines

Preferably an injection-moulding die with at least one cavity is used for the production of the pre-moulded part, and at least one further cavity for the production of the finished part. The overall volume of the cavity for the finished part is greater than that of the cavity for the pre-moulded parts. Self-evidently, the die can have any technically useful number of cavities. It is also possible that the cavities for pre-moulded part and finished part are arranged in different dies. These dies can all be operated in one machine or else in different machines.

For three-layer injection-moulded parts, all of the cavities for the production of the pre-moulded parts collectively are also called first station in the following, the one for the production of the finished parts is called second station. In an injection-moulded part built up of five layers, in this embodiment a pre-moulded part would be produced accordingly in a first station, at least partially overmoulded on both sides in the second station, and again at least partially overmoulded in a third station. This nomenclature takes into consideration the case that, respectively, a top and bottom layer are produced in the same station and in the same cycle. The top and bottom layer can be sprayed via the same sprue or gate or also separately from one another.

Alternatively, however, it is also conceivable to produce top and bottom layers in each case in separate stations, thus one after the other.

Sequence

There follows, in a particularly preferred embodiment, a detailed demonstration of the sequence of a method. Firstly, pre-moulded (first-stage moulded) parts are produced by injecting injection-mouldable material into the cavities of the first station provided for this purpose, and these are cooled in the die until they are sufficiently dimensionally stable for demoulding. There is generally dimensional stability when the sprue and—if present—projections of the injection-moulded part are cooled to a temperature at least below the glass-transition temperature of the plastic. Additionally, the solidified edge layer in the thick-walled area of the injection-moulded part (in optical lenses this is usually the optically active area of the lens) must have reached a certain minimum thickness for dimensional stability. This minimum thickness is achieved when the demoulding and a subsequent introduction of the preform into the second station is possible.

The pre-moulded (first-stage moulded) part is now removed from the cavity with a transport device, for example a robot, and transported into a cooling station. In a preferred case, the cooling station need not satisfy any specific requirements; the parts are stored there only for a specific time and cool in ambient air. In the manner described, several pre-moulded (first-stage moulded) parts are now produced and in sequence placed in the cooling station. If there is a defined number of pre-moulded parts, the pre-moulded part produced first is inserted into the second station by the transport device after the next opening of the die. There, in the subsequent injection-moulding cycle it is at least partly overmoulded on both sides, resulting in a finished injection-moulded part (second-stage moulded part). Alternatively, the second-stage injection-moulded part can also be inserted as often as desired into a further cavity and coated again. In between this a renewed cooling outside of the cavity can—but need not necessarily—take place. Within the meaning of the invention it is not important after which layer and how often the cooling takes place outside of the cavity.

"Outside of the cavity" does not necessarily mean that the pre-moulded part has to be removed completely from the cavity. The cavity is, for example, formed from two mould inserts, one of which is arranged in the fixed mould half, the other in the movable mould half. The mould insert in the movable mould half can be realized several times. After production of a pre-moulded part, this mould insert, including the pre-moulded part, can be brought into another position, wherein simultaneously a further realization of the mould insert is brought into the injection-moulding position in the movable mould half. This can occur with the usual equipment known from multicomponent injection-moulding (e.g. rotary table, sliding table, rotatable centre plate, rotating cube mould). In these cases the pre-moulded part would be further cooled on one side in the die, on the other side in air. In this case, for example by moving a movable core back into the mould half in which the injection-moulded part remains in the die, a hollow can be provided for the subsequent overmoulding.

If the cooling station is characterized by a delimited spatial area, the pre-moulded part can be placed in the cooling station with a robot. Also, a transport device other than a robot is possible, for example an index plate which removes the pre-moulded part from the first station, and introduces it into the second station after a cooling phase outside of an injection-moulding station.

In a preferred embodiment it can be provided, that the cooling station, realized as a holding position of the index plate, is arranged outside of a dividing surface of the injection moulding die. This can be attained, for example, through arranging a rotating axis of the index plate outside of the center. Alternatively the die can be constructed narrow enough.

But it can also be provided, that the cooling station is a—preferably tempered—cavity nest arranged in the injection moulding die. Tempering means to hold the temperature of the cavity at a certain level, for example using a medium. This temperature can be warmer or colder than room temperature.

In a preferred embodiment the ambient medium when cooling outside of an injection-moulding station is air. However, any other suitable gaseous, liquid (water) or solid medium may also be used. Within the meaning of the invention it is provided only that the cooling takes place outside of an injection-moulding station.

In a preferred embodiment a new pre-moulded part is also produced again in the same cycle. The pre-moulded part and finished part are thus produced substantially in parallel, thus in the same cycle.

Number of Injection-Moulding Units

As already described, the layers can be produced in one or in several machines. If production is to take place in one machine, this can be equipped with optionally one, two, three or more injection-moulding units.

Hereinafter, some preferred possibilities for the production of a 3-layer injection-moulded part with one machine are explained:

Depending on the number of injection-moulding units, the design of the sprue and the sealing mechanisms present in the die, the layers can be filled simultaneously or one after the other.

If three injection-moulding units with respectively separate connections are available for the three layers, the filling processes can be started simultaneously or time-delayed and are carried out with different parameters (speeds, pressures, times). Due to the independent filling, this variant permits the greatest degrees of freedom. In order to prevent flow lines, different screw advance speed profiles and/or pressure profiles may be required, especially in the outer layers. It is particularly preferably provided to match the filling processes of the two outer layers to each other such that an equilibrium of forces prevails in the cavity. This is because in some cases the force on the pre-moulded part during overmoulding can be substantially greater on one side than on the others, which could result in displacements, deformations or fracture of the pre-moulded part.

If there is only one injection-moulding unit and no sealing mechanism available in the die for the individual cavities or layers, the simultaneous filling must take place with a common screw advance speed profile and/or pressure profile. The equilibrium of forces described previously can be ensured already during die construction by rheological balancing of the sprues and cavities.

If an injection-moulding unit and a sealing mechanism is available for each cavity/layer, at least the start and stop times of the mould-filling processes can be chosen independently of one another.

Saving Cooling Time Through a Low Die Temperature

Smaller or local deformations on the pre-moulded part, such as for example sink marks caused by shrinkage, do not represent a problem in this method, as they are compensated for during subsequent overmoulding in the following station. It is thereby possible to operate the first station at die temperatures which are so low that an acceptable moulding of the component contour is not guaranteed. Additionally, it is not strictly necessary that the surface of the cavity of the pre-moulded part has an optical surface, such as e.g. a mirror finish.

Often, thick-walled injection-moulded parts, such as for example optical lenses, have comparatively thin-walled areas, such as circumferential edges, fixing or design elements. It can be advantageous not to overmould these areas in a further station but to finish them already in the first station. Such areas can then be used in a further station for fixing the preform. EP 2 402 140 A1 discloses for example an optical lens with a circumferential edge which is used in the subsequent process cycle to hold and position the preform.

In the case of optical lenses these areas thus do not have any optical function but must meet certain requirements in terms of surface quality, dimensional accuracy, mechanical properties or the like. A low die temperature can prove to be disadvantageous. It can thus be necessary to operate the cavities for pre-moulded part and for the subsequent layers substantially at the same die temperature.

The lower die temperature can also have a negative effect on the internal properties of the injection-moulded part.

According to the invention it is provided that a part of the cooling of the preform takes place after demoulding from the cavity. In contrast to the cooling in the die, cooling outside has no influence on the cycle time. Therefore, a short cycle time can be achieved even at high temperatures of the cavities of the pre-moulded part.

Therefore all stations of the die can—but need not necessarily—be operated at the same die temperature. Temperature gradients and thermal stresses caused by different tempering are thereby avoided in the die—more homogeneous temperature distribution, lower energy consumption and optionally a lower number of tempering devices are the result.

Adhesion of the Layers

Depending on the injection-moulding material used, a specific minimum temperature, in particular a specific minimum surface temperature of the pre-moulded part, can be necessary in order to achieve on the one hand good adhesion to the following layer, and on the other hand low internal stresses in the injection-moulded part.

Cooling in air takes place more slowly than cooling in the die, therefore the temperature gradient between the centre of the component and the surface of the component is also lower. In other words, when a defined temperature T* in the centre of the moulded part is reached, the temperature on the surface of the injection-moulded part is comparatively higher and the temperature distribution along a cross-section of the injection-moulded part is more homogeneous if cooling takes place in ambient air instead of in the die.

When using a thermoplastic as injection-moulding material, the contact temperature at the boundary layer between cooled pre-moulded part and the melt flowing into the further station should advantageously be in the region of or above the glass-transition temperature or crystallite melting temperature of the thermoplastic. If the same injection-moulding material is used, the contact temperature corresponds to the average value of the temperatures of both contact partners.

However, with long cooling outside of the cavity it can be advantageous to heat, in a targeted manner, at least the area of the surface subsequently to be overmoulded. This heating can for example take place by means of infrared radiators or with any other known methods.

Cleanliness

It can be advantageous to prevent impurities on the surfaces of the pre-moulded parts as these remain permanently in the component due to the subsequent overmoulding. Therefore it is recommended to design the whole production installation, the area of the cooling station and/or the removal area and/or the die area as a clean room or contamination-free area. However, a laminar flow cabinet can also be installed over the area to be protected.

Alternatively, the cooling station and/or the removal area and/or the die area can be surrounded by a housing that is sealed as far as possible.

Preventing Convection, Causing Controlled Convection

Moreover, it can be advantageous that the quantity of heat removed from the pre-moulded part by free or forced convection can be reproduced from cycle to cycle. Uncontrolled streams of air, e.g. through open hall doors, should advantageously also be avoided in respect of the changed convection in addition to the danger of contamination. An enclosure of the cooling station and/or of the removal area and/or of the die area to prevent uncontrolled convection can provide a remedy here.

Alternatively to preventing forced convection, such a housing can also, however, be used in a targeted manner for more rapid and controlled cooling of the pre-moulded part. Any suitable—preferably gaseous—medium, in particular air, can be used for this purpose. It can also be useful to temper this medium in order thus to control or regulate the progression of the cooling in a targeted manner. In this case, a sensor system for measuring the temperature of the pre-moulded part in the cooling station is expedient. Generally, sensors for measurement, documentation and control or regulation of the ambient conditions (temperature, air humidity, flow speed, etc.) in the cooling station can be advantageous.

Cooling Station as a "Climate Chamber"

In order to be able to influence the temperature profile of the pre-moulded part still better, the ambient conditions in the cooling station can be designed to vary in terms of time and/or location.

For example, the pre-moulded parts in the cooling station can be conveyed with a conveyor belt or another device for transporting the pre-moulded parts through different zones, in particular temperature zones and/or media flow zones. The temperature profile can be chosen to follow a falling, rising or any desired profile. Here, a targeted heating of the surface of the pre-moulded part can also take place before insertion into a further injection-moulding station.

Instead of moving the pre-moulded parts to different zones, it is also conceivable to leave these at a defined location and to change the ambient conditions there over time.

Cooling or Tempering by Thermal Conduction

The temperature profile of the preform can also be influenced, in a targeted manner, by thermal conduction. Putting the pre-moulded part on a tempered plate can serve as an example. This plate can also be part of a previously mentioned device for transporting pre-moulded parts within the cooling station.

Isolating the Surface

It can also prove to be favourable to ensure the slowest possible removal of heat in the cooling station, for example by isolating the surface of the pre-moulded part. A better matching of the temperature between component centre and component surface is thereby achieved.

BRIEF DESCRIPTION OF THE DRAWINGS

Further advantages and details are apparent from the figures as well as the associated description of the figures. There are shown in:

FIG. 2, shows schematically, a device according to the invention with a centre plate die and a handling robot, FIGS. 8A-8F are several sectional representations of the die from FIG. 7A to illustrate the method according to the invention.

DETAILED DESCRIPTION OF THE INVENTION

Figure 1A:
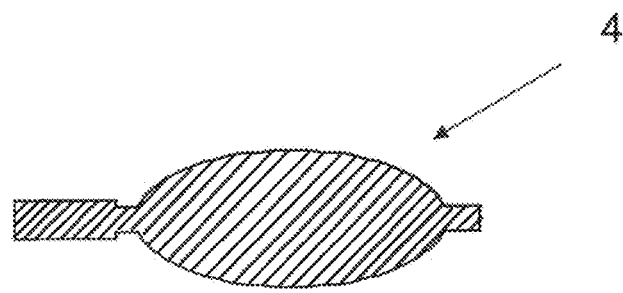
FIGS. 1A and 1B are sectional representations of a pre-moulded part and a finished lens which was produced with a method according to the invention.
Figure 1B:
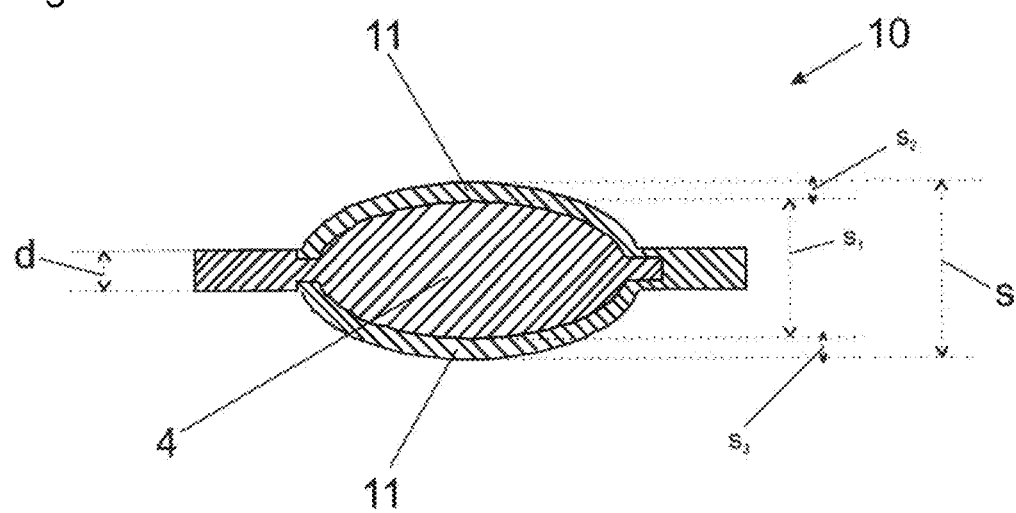

FIG. 1A shows a pre-moulded part 4. FIG. 1B shows an injection-moulded part 10 produced from the pre-moulded part 4. Furthermore, the overall thickness s of the lens as well as the layer thicknesses $s_1$ of the pre-moulded part 4 and the layer thicknesses $s_2$ and $s_3$ of the further layers 11 are shown.

The ratio of the thicknesses of the thickest areas to the thinnest areas of the injection-moulded part 10 here is approximately s/d~4.3.

For the purposes of graphic simplicity, the outer layers 11 are shown symmetrical, which is not essential to the invention. In the practical application case, a complete symmetry between outer layers 11 will actually be the exception.

In FIGS. 1A and 1B, the pre-moulded part 4 has one layer. In particular in an injection-moulded part with more than two layers 11, the pre-moulded part 4 itself can also have several layers.

FIG. 2 shows an embodiment of a device according to the invention, which has a center plate 12 and two injection units 13. A transport device 3, which in this case is designed as a handling robot 9, transports pre-moulded parts 4 between the injection-moulding stations 2 and the cooling station 5 in which some of the pre-moulded parts 4 are residing to cool.

FIGS. 3A-3D show schematic representations of different embodiments of the invention making use of an index plate.

An index plate is understood to be a device with which parts can be transported from one die station to the next. The single die stations on the fixed side are stationary with respect to the fixed die platen, as the die stations on the moveable side are stationary with respect to the movable die platen. Consequently, there is the possibility to provide form giving areas with different geometries for every station on the fixed as well as the moveable side. So on the fixed and on the moveable side, hollow spaces can be provided in a further injection moulding station (e.g. S2), which allows for an overmoulding on both sides of the injection moulding part.

But areas of the index plate 16, which touch the injection moulding part from the first injection moulding station S1 up to final demoulding are necessary. These areas serve as holding areas for the part during transportation. As in these areas, the final injection moulded part surface will be shaped already in the first injection moulding station S1, one will generally try to keep these surfaces as small as possible in comparison with the surface of the whole part. In FIGS. 3A-3D the parts are merely held by arms 18, which are disposed in a star shape around the rotation point and on which the holding positions 17 for the pre-moulded parts are disposed. The detailed execution of the holding mechanism is not shown. Of course index plates 16, which enclose the part can also be employed.

The index plate 16 requires an actuator (not shown) for the rotation as well as an actuator for lifting the index plate in the direction of the machine axis X. The direction of the rotation axis is at the same time the axis of lifting.

Figure 3A:
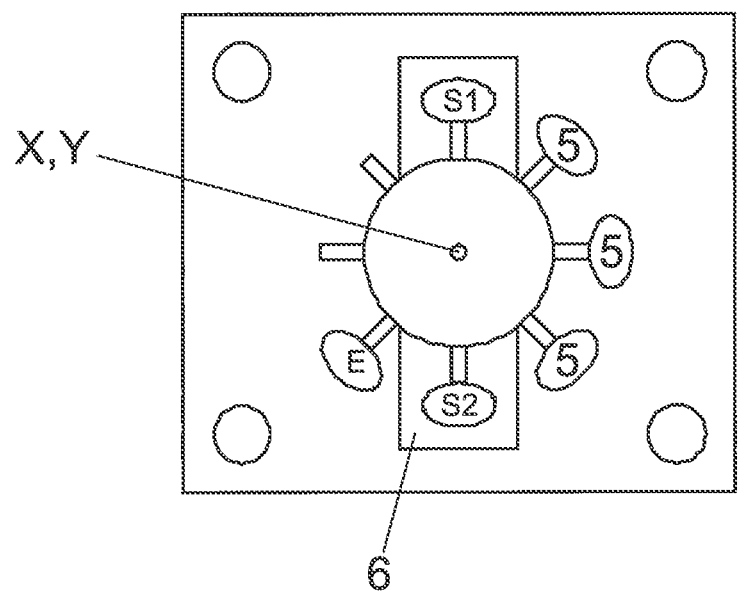
FIGS. 3A-3E, show schematically, different embodiments of the invention including an index plate.

FIG. 3A shows schematically a first embodiment of the invention with an index plate. S1 marks the first injection moulding station, S2 the second injection moulding station. Between these there are disposed several cooling stations 5. The rotation is done clockwise. Optionally the position E can be used for removing the finished injection moulded parts. The rotation axis Y of this index plate is in the center of the plate for symmetry reasons.

The disadvantage in this arrangement lies in a relatively large requirement of space. For a relatively small die, big die platens and hence a big machine are necessary.

Figure 3B:
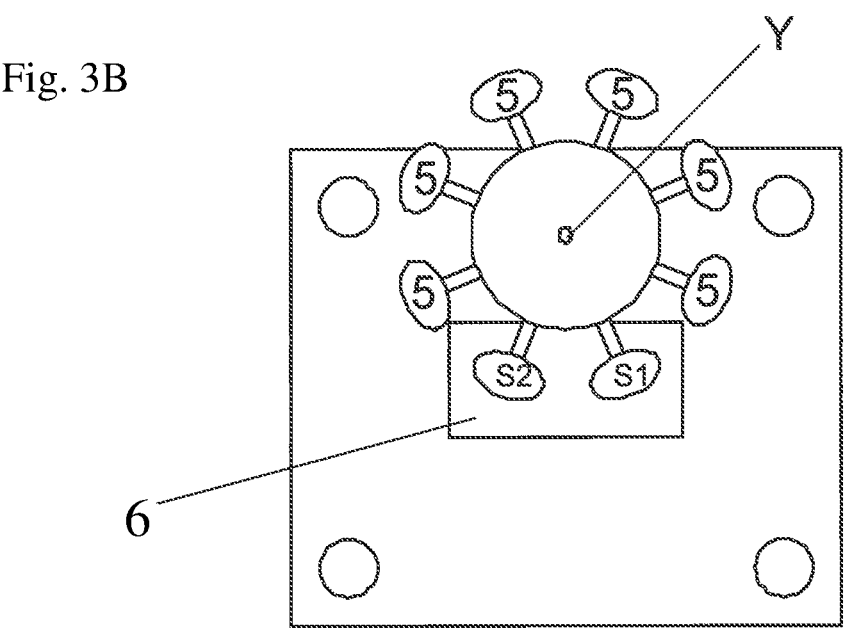

This disadvantage can be alleviated through an arrangement of the axis of rotation Y outside of the center, as depicted in FIG. 3B.

With an arrangement according to FIG. 3B all the die stations except for the injection moulding station S1 and S2 can be used as cooling stations 5.

Figure 3C:
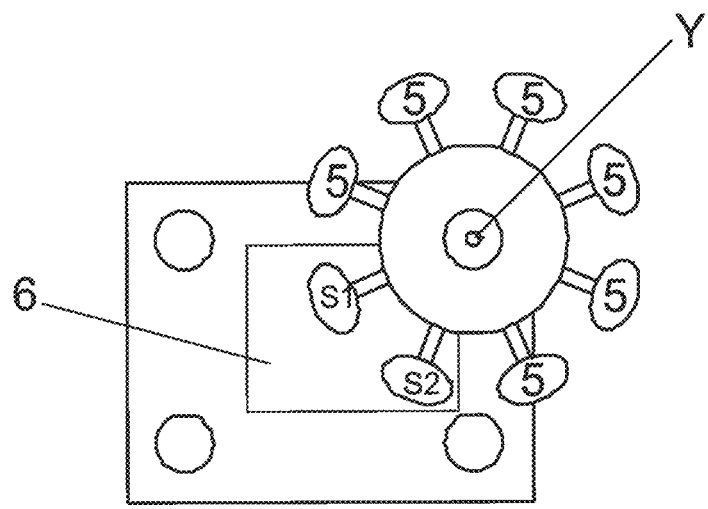

It is also possible to arrange the rotation axis Y of the index plate 16 in or at a tie bar of the closing unit 15 (FIG. 3C). This can save space in comparison to FIG. 3B, which makes it possible to use smaller machines.

Figure 3D:
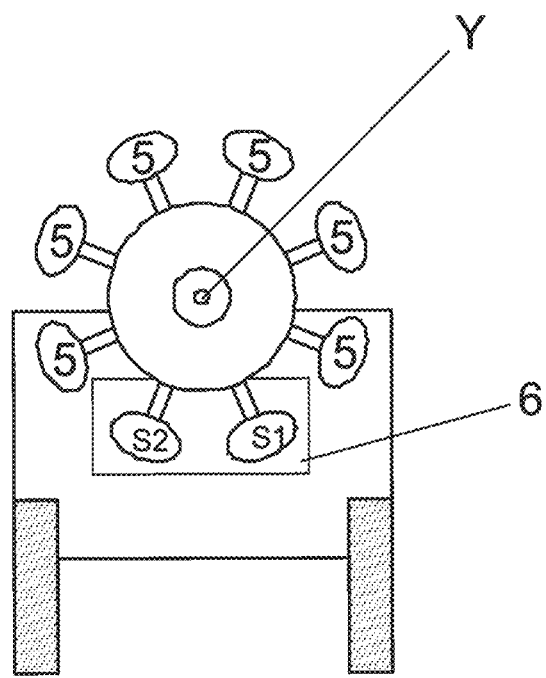

A further reduction of the size of the die platens can be reached with closing unit of the type without tie bars, which is schematically depicted in FIG. 3D.

Figure 3E:
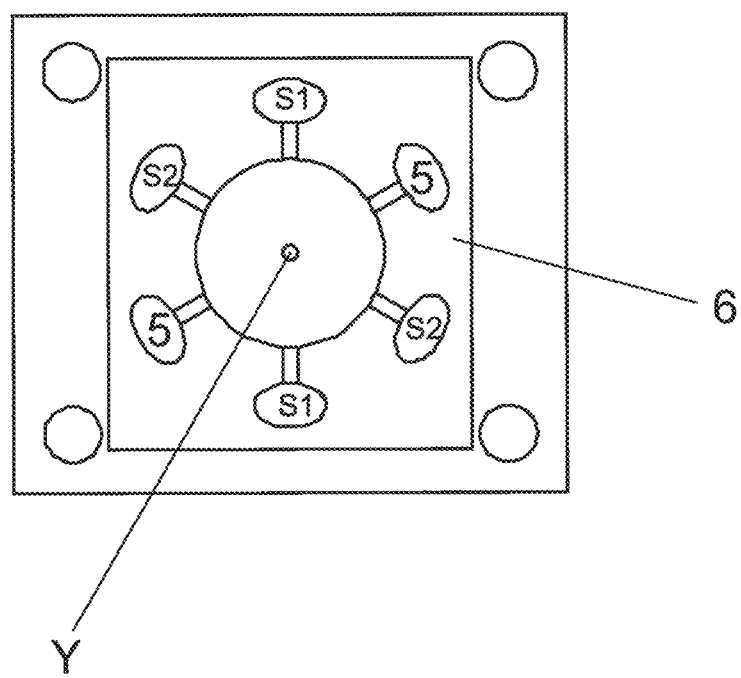

FIG. 3E shows a solution with an index plate with cooling in the ambient air, but rather with cooling stations 5 inside the die. The pre-moulded part produced in S1 is at first cooled in S1 and K, before it is overmoulded. This intermediary cooling the distribution of the layers can be changed such that the outside layers can be made thinner. This reduces cycle time.

Figure 4:
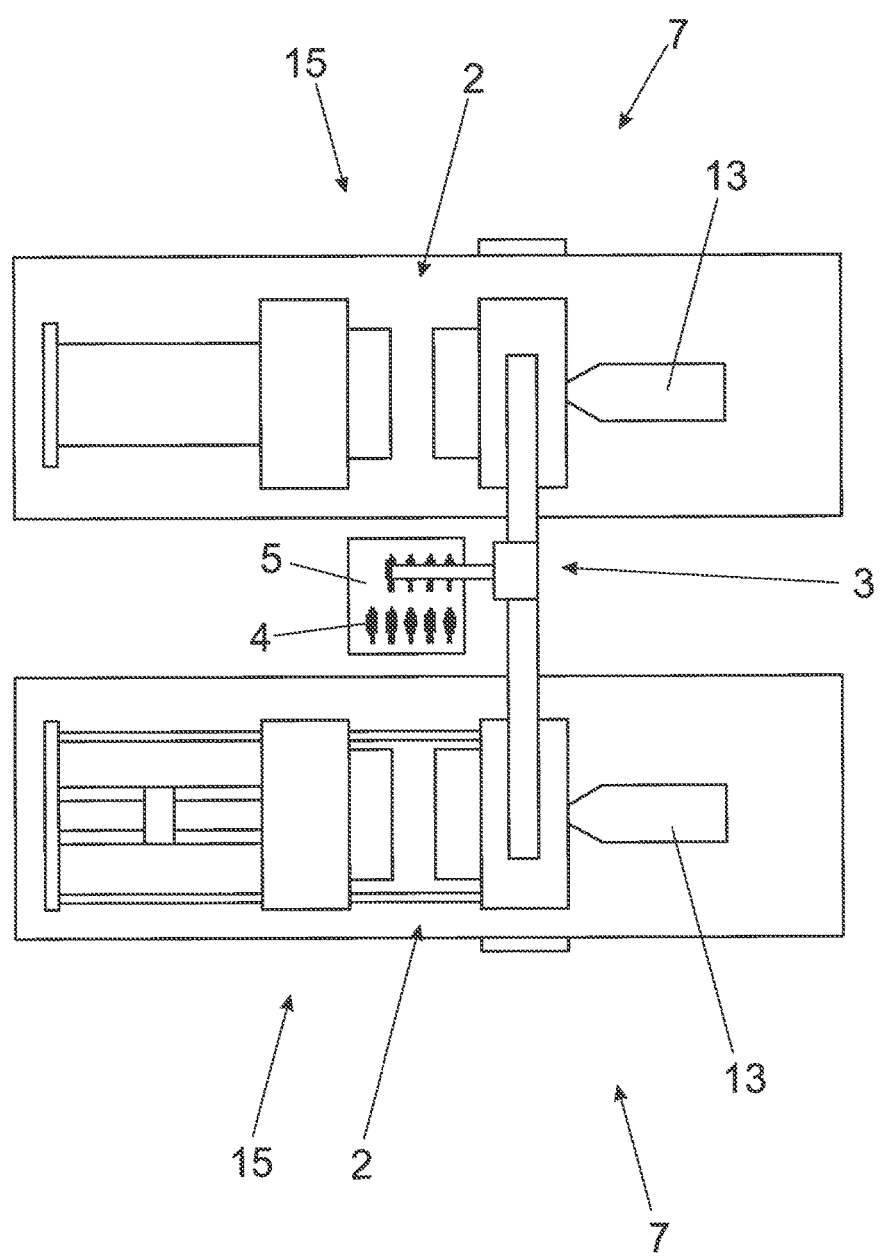
FIG. 4, shows schematically, a device according to the invention with two injection-moulding machines and a handling robot.

In FIG. 4 an embodiment of the invention is shown with two injection-moulding machines 7, a cooling station 5 arranged therebetween and a transport device 3 which is formed as handling robot 9. Some of the pre-moulded parts 4 are cooling in the cooling station 5. By way of example, there are shown an injection-moulding machine 7 with a hydraulic closing unit 15 (shown schematically), and an injection-moulding machine 7 with an electric toggle joint closing unit 15 (shown schematically). The design of the closing unit 15 is, in fact, not important for the invention.

Figure 5:
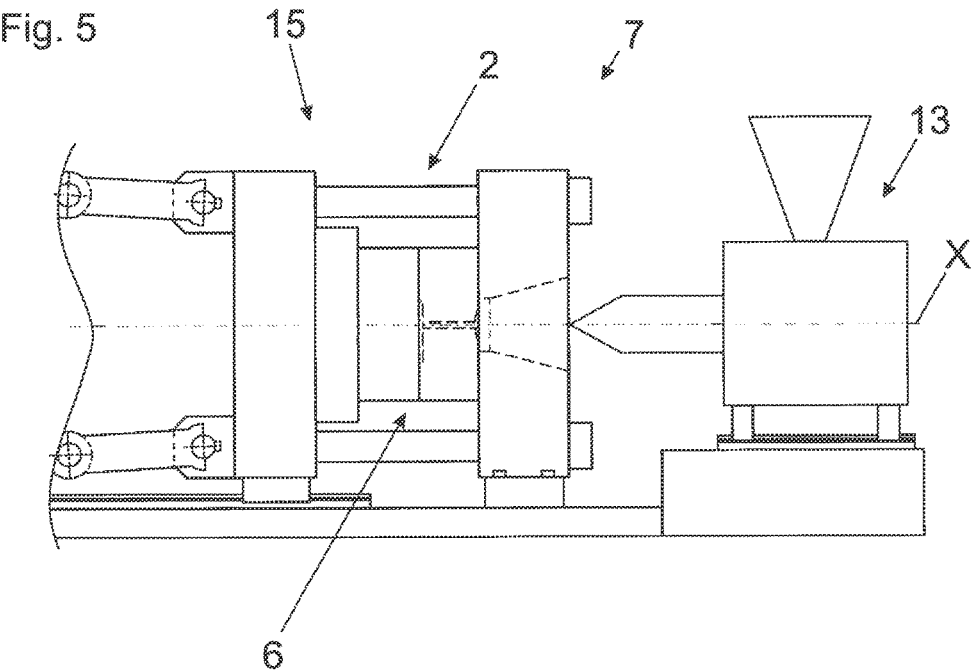
FIG. 5 is a representation of an injection-moulding machine.

FIG. 5 shows a somewhat more detailed representation of an injection-moulding machine 7 with a closing unit 15 (in this case, an electric toggle joint closing unit) and an injection unit 13. The injection-moulding station 2 is formed by the two halves of the injection-moulding die 6.

Figure 6:
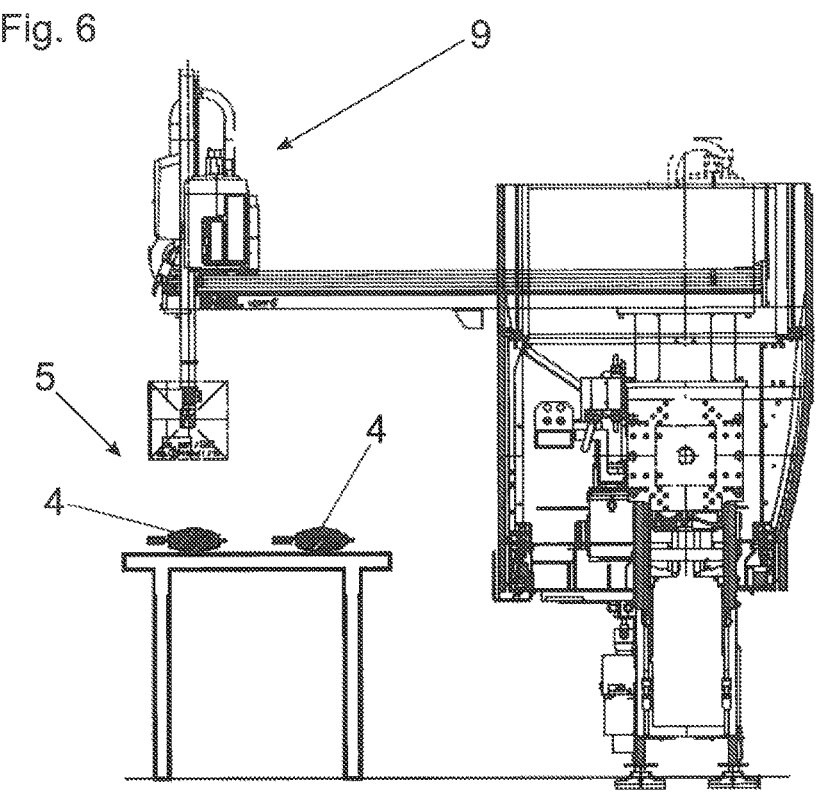
FIG. 6 is a representation of a handling robot.

A handling robot 9 is shown in FIG. 6. These handling robots 9 can be designed very differently, as is apparent from the embodiments from FIG. 2 and FIG. 4. In this case, the cooling station 5 is a passive one, in which pre-moulded parts 4 only cool in ambient air.

Figure 7C:
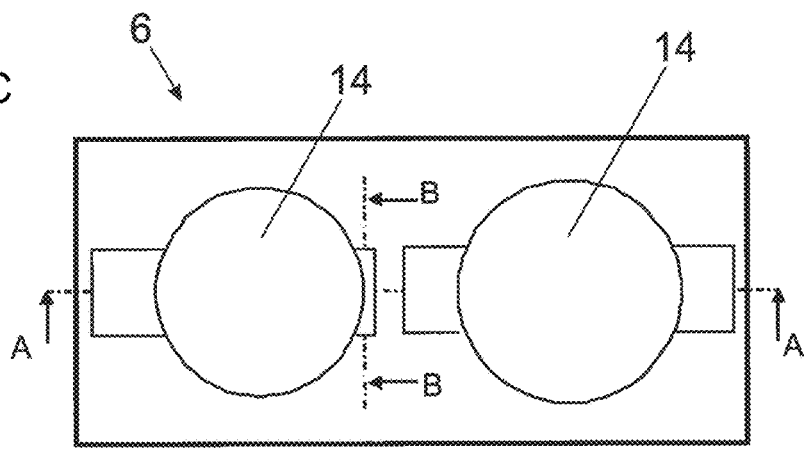
FIGS. 7A-7C are schematic sectional representations of an injection-moulding die of a device according to the invention.
Figure 7A:
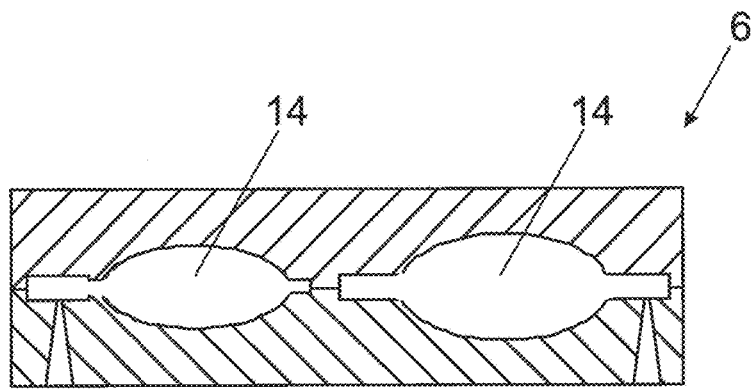
Figure 7B:
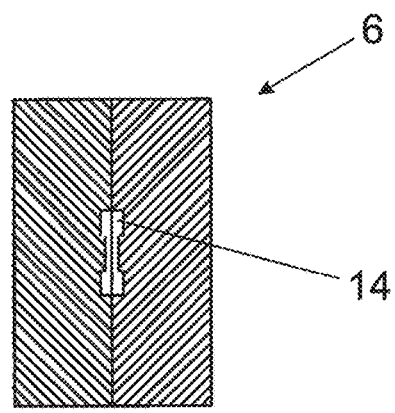

FIG. 7C shows a schematic top view of an injection-moulding die 6, in which there is one injection-moulding station—comprising a cavity 14—in each case for producing pre-moulded (first-stage moulded) parts 4 and finished injection-moulded (second-stage moulded parts) parts 10. FIG. 7A shows a sectional representation on the plane A from FIG. 7C. In the second station, shown on the right, the pre-moulded part produced previously in the first station, shown on the left, is overmoulded on the top and bottom side to form a second-stage moulded part (which can be a finished injection-moulded part). The top and bottom layers are sprayed via a common sprue. FIG. 7B shows a sectional representation on the plane B from FIG. 7C.

FIGS. 8A-8F illustrate a method sequence according to the invention using an injection-moulding die 6 from FIGS. 7A-7C.

In FIG. 8A, the die 6 is closed, wherein a pre-moulded part 4 and an injection-moulded part 10 rest in the cavities 14 of the die 6. The mould die 6 is now opened, which is shown in FIG. 8B.

Figure 8C:
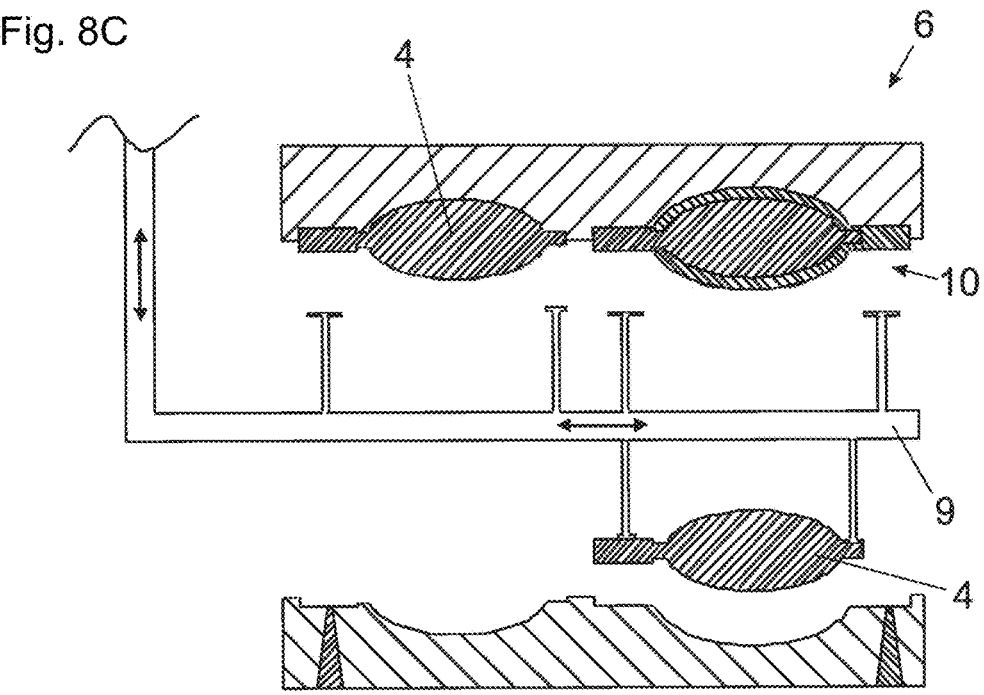
Figure 8D:
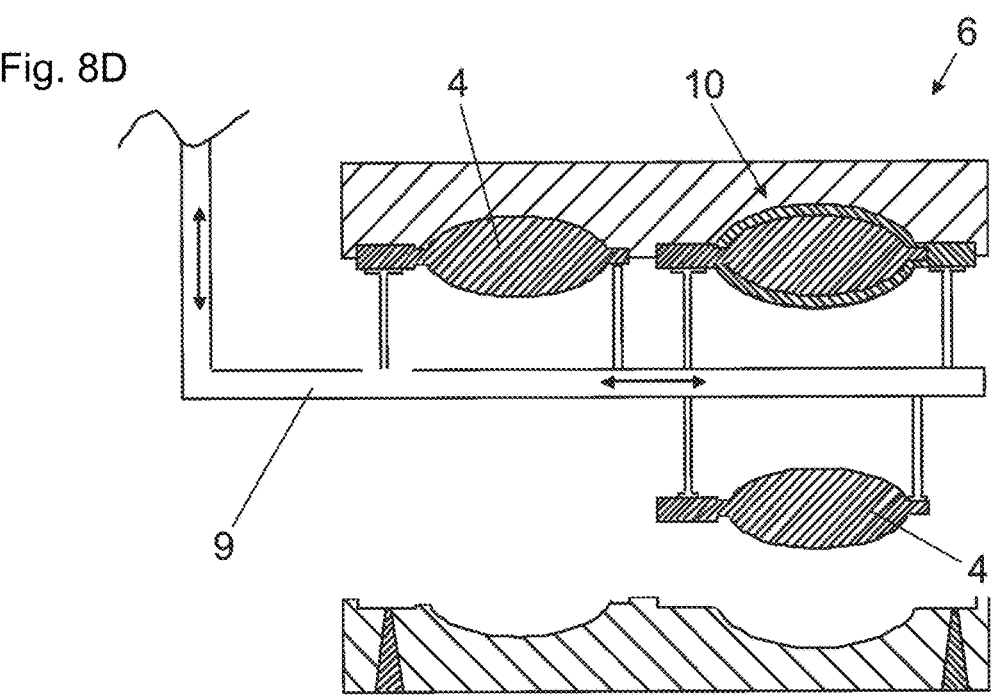
Figure 8E:
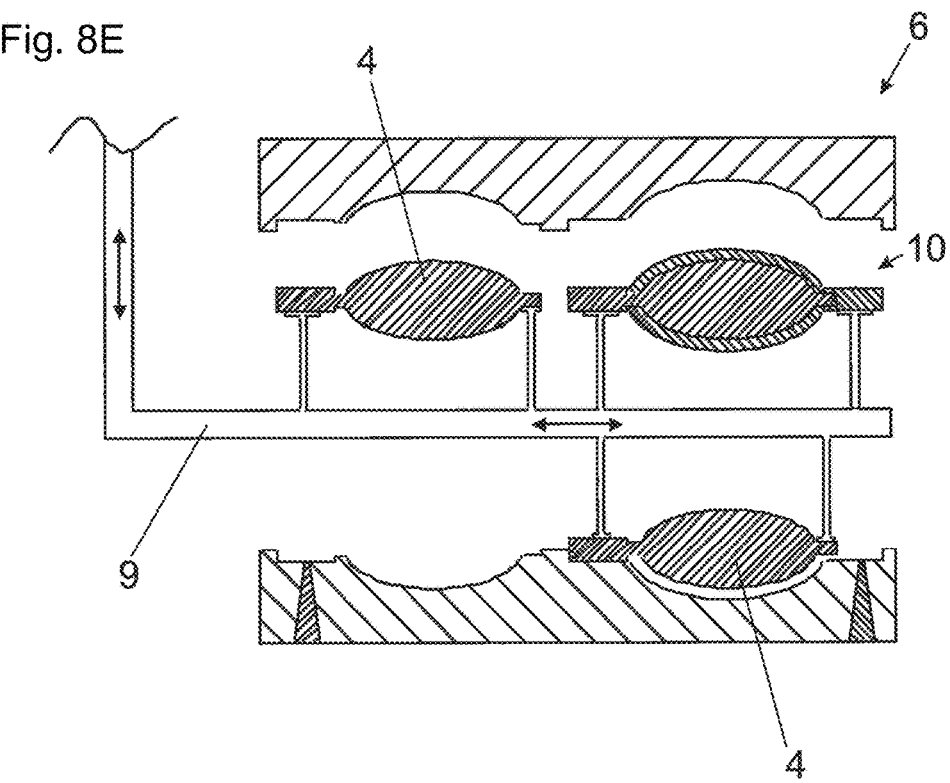

A transport device 3—here a handling robot 9—is introduced into the resulting intermediate space, wherein this carries a cooled pre-moulded part 4 out of the cooling station 5, which is not shown (FIG. 8C). As shown in FIG. 8D, the handling robot 9 receives the pre-moulded part 4 and the injection-moulded part 10 from the mould half of the die 6. The pre-moulded part (first-stage moulded part) 4 and the injection-moulded (second-stage moulded part) part 10 are demoulded and, simultaneously, the pre-moulded part 4 carried by the handling robot 9 is introduced into the other mould half of the die 6 (FIG. 8E). Here, the projection, shown on the right in the drawing on the injection-moulded part, is designed as shown in FIG. 7B, with the result that the pre-moulded part is fixed on both sides.

Figure 8F:
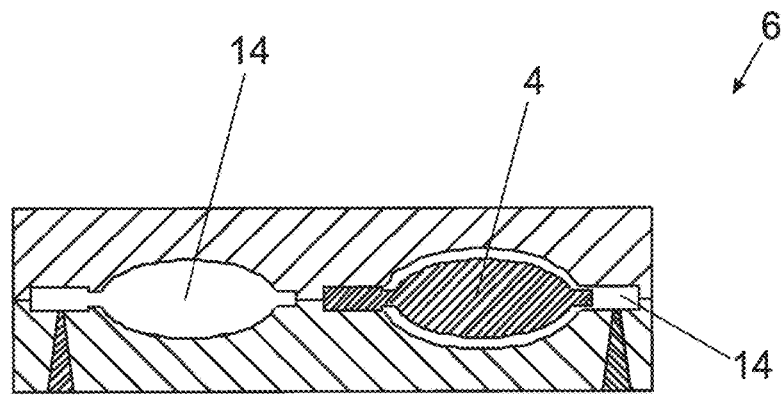

Then the handling robot 9 moves away and the mould die 9 is closed (FIG. 8F). The pre-moulded part, cooled previously in the cooling station 5, not shown, is held in the second injection-moulding station by a projection. Plasticized plastic can now be introduced into both cavities 14, as a result of which the situation from FIG. 8A reoccurs.

It is to be noted that the cavity 14 shown in FIG. 8F is bordered by both halves of the mould die 6 as well as by the pre-moulded part 4.

Figure 9:
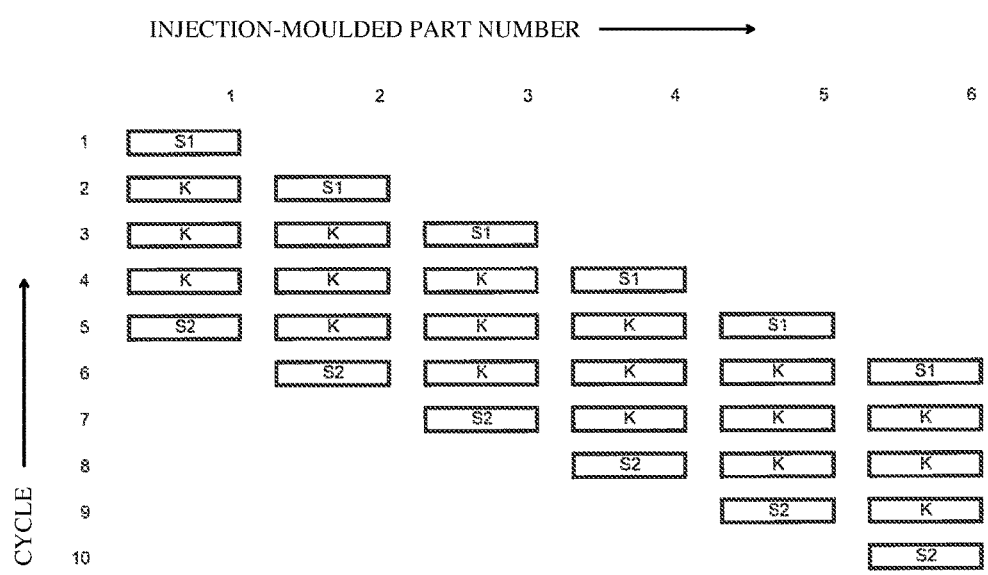
FIG. 9 is a table to illustrate the production sequence in mass production.

In FIG. 9, the process sequence in mass production is broken down into injection-moulded parts and cycle numbers. For example, the pre-moulded part 4 of the injection-moulded part with the number #4 is produced in the fourth cycle (process step S1). Thereafter, it is cooled in the cooling station 5 for three cycles (process steps K). Finally, in cycle #8, the pre-moulded part 4 is coated and the finished injection-moulded part is completed (process step S2).

Read differently, in cycle #5, the pre-moulded part 4 of the fifth injection-moulded part is injection-moulded (S1), the pre-moulded parts 4 of the injection-moulded parts #2 to #4 are cooled (K) and the injection-moulded part #1 is completed (S2).

FIGS. 10A-10E show time-dependency diagrams for different designs of the process sequence. In each case, the sequences for an example with three cavities 14, numbered consecutively K1, K2 and K3, are shown. One layer is produced in each of the three cavities. In these five examples, K1 always forms the pre-moulded part (first-stage moulded part) 4. In this example, the three cavities (K1, K2, K3) are sprayed separately from one another. Thus, the second cavity K2 can be used to form the second-stage moulded part 10, while the third cavity K3 can be used to form a third-stage moulded part. The second (K2) and third cavity (K3) can be formed in a common injection-moulding station 2, in this case they are separated from one another by the introduced pre-moulded part 4. Alternatively, the second and third cavity (K2, K3) can also be designed in separate injection-moulding stations 2.

Figure 10A:
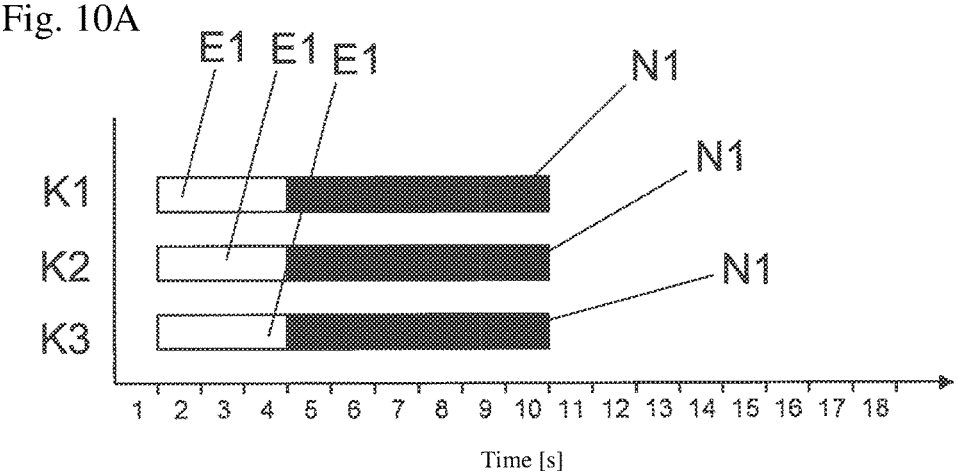
FIGS. 10A-10E are time-dependency diagrams for different designs of the process sequence.

If there is only one injection-moulding unit 13 and no sealing mechanisms, the injection phases E1 and the holding pressure phases N1 are synchronous for the cavities (K1, K2, K3) (FIG. 10A). As, however, the demands on the injection-moulding profiles for the different layers 11 differ clearly in the normal case, other process configurations are often more efficient.

Figure 10B:
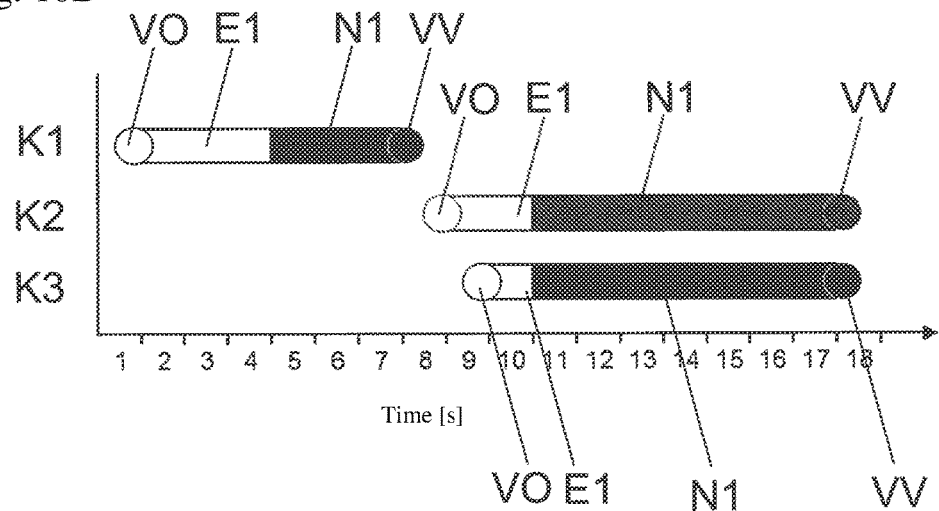

An example with an injection-moulding unit 13 and sealing mechanisms for each cavity (K1, K2, K3) is shown in FIG. 10B. As the injection-moulding profile for the middle layer will differ the most from that of the outer layers 11, only the latter are to be carried out simultaneously. A cycle for a cavity (K1, K2, K3) consists of the opening of the sealing mechanism (VO), an injection phase E1, a holding pressure phase N1 and the closing of the sealing mechanism (VV).

Figure 10C:
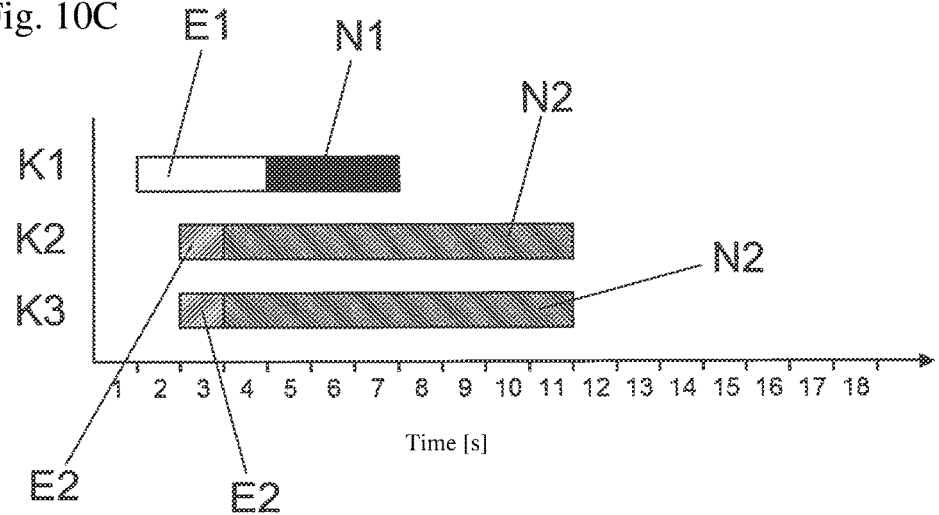

A process embodiment with two injection-moulding units 13 but without sealing mechanisms is shown in FIG. 10C. The injection phase E1 for the first injection unit 13 and the injection phase for the second injection unit 13 can be carried out simultaneously here. The same applies to the holding pressure phases N1 and N2.

Figure 10D:
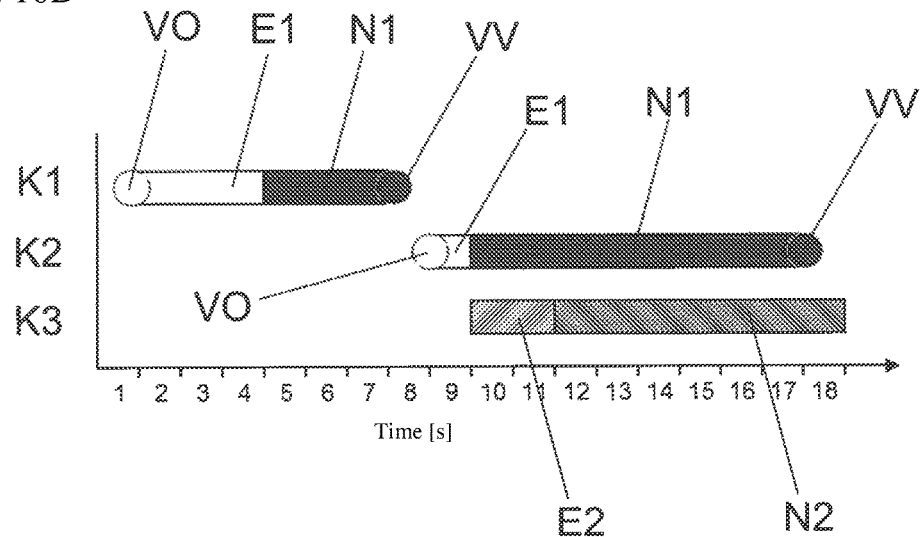

In FIG. 10D a hybrid is shown in which two injection-moulding units 13 and sealing mechanisms are available on the cavities K1 and K2.

Figure 10E:
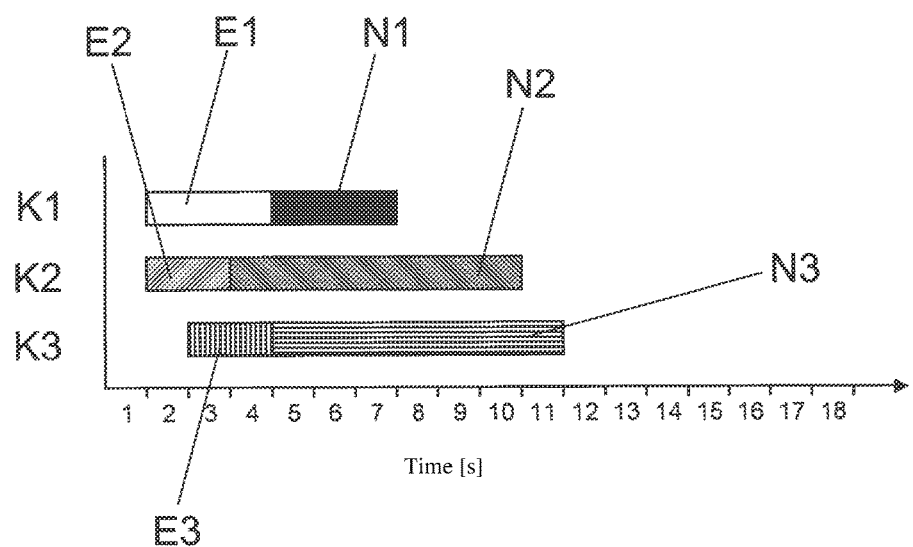

FIG. 10E shows an ideal situation with three injection-moulding units 13. Sealing mechanisms are, in this case, no longer strictly necessary, as the injection phases E1, E2 and E3 as well as the holding pressure phases N1, N2 and N3 for the three injection units 13 can be regulated or controlled separately through these.

Figure 11:
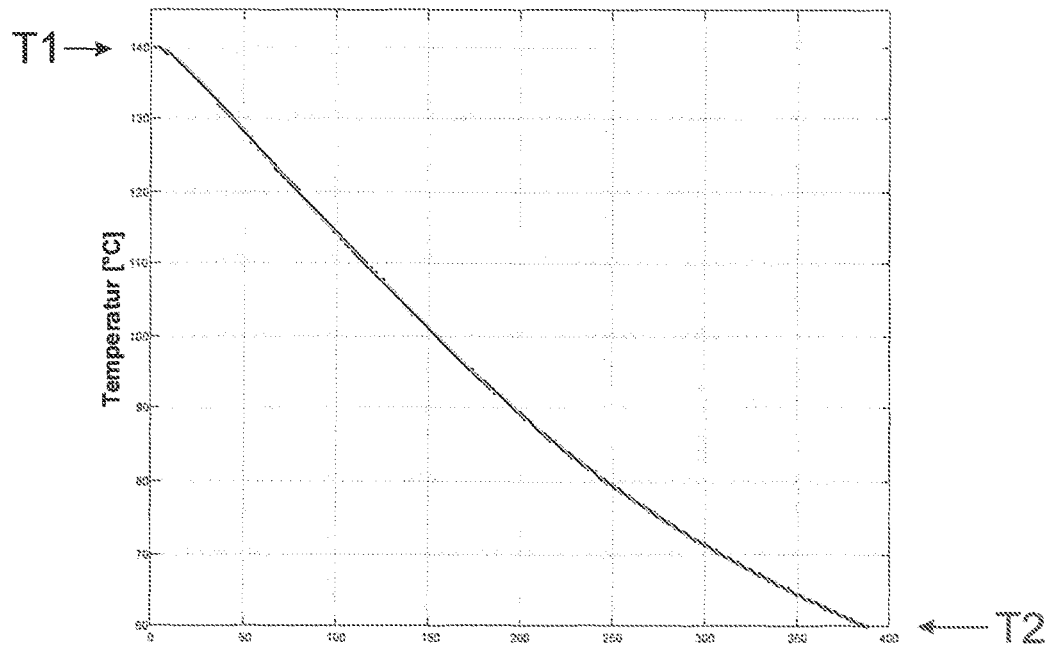
FIG. 11 is a temperature diagram of a cooling, according to the invention, of a pre-moulded part, as well as FIG. 12 is a temperature diagram for comparing the temperatures at different removal times of the pre-moulded part.

FIG. 11 is a temperature diagram on which the temperature profile on the surface of the pre-moulded part 4 from the time of removal from a cavity 14 (see FIGS. 8A-8F) until introduction into the cavity 14 for coating of the pre-moulded part 4 can be read. This profile was measured, during cooling in ambient air, on a 15-mm thick pre-moulded part 4 produced from polycarbonate. The temperature at the time of demoulding is denoted as T1. The temperature at the time of introduction into the next cavity 14 is denoted as T2.

Figure 12:
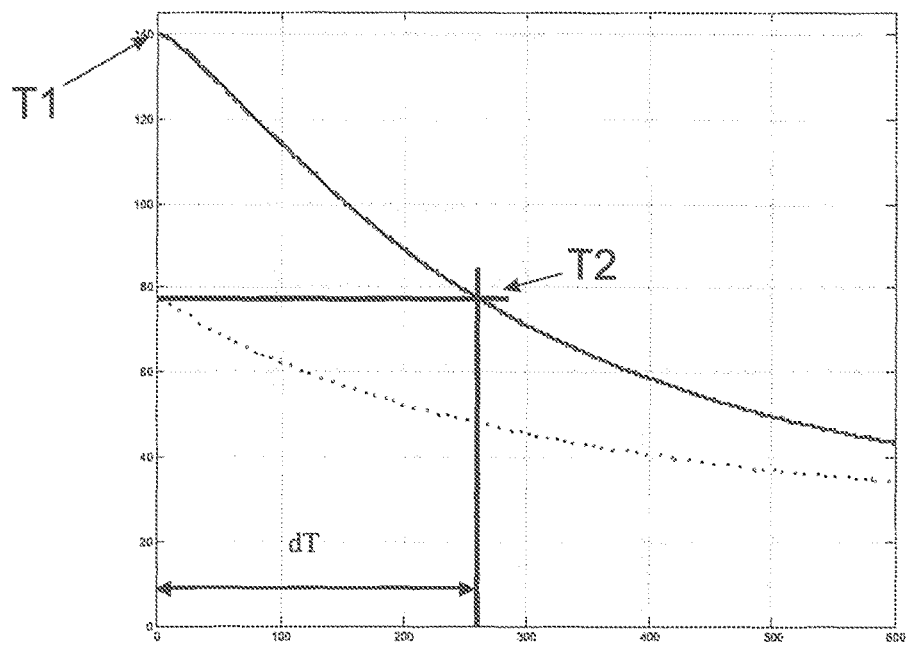

FIG. 12 shows the surface temperature as a function of time during cooling in air for a 15-mm thick pre-moulded part 4 which was removed after 25 s (upper curve) and after 130 s (lower curve). After a cooling time of dT=262 s in air, the pre-moulded part 4 removed earlier has the same surface temperature as the pre-moulded part 4 removed later.

The invention claimed is:

1. A method for production of an injection-moulded part, said method comprising:
    casting an injection-moulding material in at least two injection-moulding stations using at least two injection-moulding processes to form a first-stage moulded part and a second-stage moulded part, respectively, the second-stage moulded part being formed from the first-stage moulded part;
    moving the first-stage moulded part from a first one of the at least two injection-moulding stations to a cooling station using a transport device after completion of a first one of said at least two injection-moulding processes;

cooling the first-stage moulded part produced in the first one of said at least two injection-moulding processes in the cooling station between the first one of said at least two injection-moulding processes and a second one of said at least two injection-moulding processes;

moving the first-stage moulded part from the cooling station to a second one of the at least two injection-moulding stations using the transport device after completion of the cooling of the first-stage moulded part in the cooling station;

wherein the second one of said at least two injection-moulding processes includes injecting resin into a cavity of the second one of the at least two injection-moulding stations to form the second-stage moulded part and cooling the second-stage moulded part in the cavity of the second one of the at least two injection-moulding stations;

wherein each of said at least two injection-moulding processes is performed for one cycle, each cycle requiring an amount of time, said cooling comprising holding the first-stage moulded part in the cooling station for at least three cycles;

wherein the first-stage moulded part is a first first-stage moulded part, and after the first first-stage moulded part is cast in the first one of the at least two injection-moulding stations during a first cycle and is moved from the first one of the at least two injection-moulding stations to the cooling station using the transport device, a second first-stage moulded part is cast in the first one of the at least two injection-moulding stations during a second cycle while the first first-stage moulded part cools in the cooling station;

wherein, after the second first-stage moulded part is cast in the first one of the at least two injection-moulding stations during the second cycle and is moved from the first one of the at least two injection-moulding stations to the cooling station using the transport device, a third first-stage moulded part is cast in the first one of the at least two injection-moulding stations during a third cycle while the first first-stage moulded part and the second first-stage moulded part cool in the cooling station; and wherein, after the third first-stage moulded part is cast in the first one of the at least two injection-moulding stations during the third cycle and is moved from the first one of the at least two injection-moulding stations to the cooling station using the transport device, a fourth first-stage moulded part is cast in the first one of the at least two injection-moulding stations during a fourth cycle while the first first-stage moulded part, the second first-stage moulded part, and the third first-stage moulded part cool in the cooling station.

2. The method according to claim 1, wherein the injection-moulded part is a lens.

3. The method according to claim 1, wherein said at least two injection-moulding processes comprise injection-moulding at least two layers of the injection-moulded part.

4. The method according to claim 3, wherein said casting of the injection-moulding material is performed to produce a (2n+1)-layer injection-moulded part, wherein n is a natural number equal to or greater than 1, said casting comprising:

injection moulding a first layer in the first one of said at least two injection-moulding processes; and injection moulding 2n layers on the first layer in a remainder of said at least two injection-moulding processes.

5. The method according to claim 4, wherein a maximum thickness of each of the 2n layers formed in said remainder of said at least two injection-moulding processes are substantially the same.

6. The method according to claim 4, wherein each of the 2n layers to be formed in said remainder of said at least two injection-moulding processes is moulded with a layer thickness which is less than $$\frac{1}{2(n+1)}$$

times an overall thickness of the injection-moulded part.

7. The method according to claim 4, wherein each of the 2n layers to be formed in said remainder of said at least two injection-moulding processes is moulded with a layer thickness which is greater than $$\frac{1}{(n+1)}$$

times an overall thickness of the injection-moulded part.

8. The method according to claim 1, wherein said cooling of each first-stage moulded part in the cooling station is performed such that a first temperature of the respective first-stage moulded part immediately after said first one of said at least two injection-moulding processes is at least 5° C. higher than a second temperature of the respective first-stage moulded part immediately before a second one of said at least two injection-moulding processes.

9. The method according to claim 8, wherein said cooling of each first-stage moulded part in the cooling station is performed such that a first temperature of the respective first-stage moulded part immediately after said first one of said at least two injection-moulding processes is at least 10° C. higher than a second temperature of the respective first-stage moulded part immediately before a second one of said at least two injection-moulding processes.

10. The method according to claim 1, wherein the second-stage moulded part is a final-form injection moulded part having an overall thickness greater than 5 mm.

11. The method according to claim 10, wherein the second-stage moulded part is a final-form injection moulded part having an overall thickness greater than 10 mm.

12. The method according to claim 1, wherein the second-stage moulded part is a final-form injection moulded part having different thicknesses, a ratio of the thickness of a thickest area of the final-form injection moulded part to a thinnest area of the final-form injection moulded part is more than 1.5:1.

13. The method according to claim 12, wherein the second-stage moulded part is a final-form injection moulded part having different thicknesses, a ratio of the thickness of a thickest area of the final-form injection moulded part to a thinnest area of the final-form injection moulded part is more than 2.5:1.

14. The method according to claim 1, wherein said at least two injection-moulding processes utilize the same injection-moulding material.

15. The method according to claim 1, wherein the second-stage moulded part is a final-form injection moulded part.

16. The method according to claim 1, wherein the second-stage moulded part is a pre-moulded part formed in a second one of said at least two injection-moulding processes, said at least two injection-moulding processes further including a third one of said at least two injection-moulding processes for forming a third-stage moulded part.

17. The method according to claim 1, wherein, after the fourth first-stage moulded part is cast in the first one of the at least two injection-moulding stations during the fourth cycle and is moved from the first one of the at least two injection-moulding stations to the cooling station using the transport device, and after the first first-stage moulded part is moved from the cooling station to the second one of the at least two injection-moulding stations, a fifth first-stage moulded part is cast in the first one of the at least two injection-moulding stations during a fifth cycle while the second first-stage moulded part, the third first-stage moulded part, and the fourth first-stage moulded part cool in the cooling station, and while the second-stage moulded part is formed from the first first-stage moulded part in the second one of the at least two injection-moulding stations.

18. A method for production of an injection-moulded part, said method comprising:
   casting an injection-moulding material in at least two injection-moulding stations using at least two injection-moulding processes to form a first-stage moulded part and a second-stage moulded part, respectively, the second-stage moulded part being formed from the first-stage moulded part; and
   cooling the first-stage moulded part produced in a first one of said at least two injection-moulding processes in a cooling station between the first one of said at least two injection-moulding processes and a second one of said at least two injection-moulding processes;
   wherein each of said at least two injection-moulding processes is performed for one cycle, each cycle requiring an amount of time, said cooling comprising holding the first-stage moulded part in the cooling station for at least three cycles;
   wherein the first-stage moulded part is a first first-stage moulded part, and after the first first-stage moulded part is cast in the first one of the at least two injection-moulding stations during a first cycle, the first first-stage moulded part is moved from the first one of the at least two injection-moulding stations to the cooling station, and a second first-stage moulded part is cast in the first one of the at least two injection-moulding stations during a second cycle while the first first-stage moulded part cools in the cooling station;
   wherein, after the second first-stage moulded part is cast in the first one of the at least two injection-moulding stations during the second cycle, the second first-stage moulded part is moved from the first one of the at least two injection-moulding stations to the cooling station, and a third first-stage moulded part is cast in the first one of the at least two injection-moulding stations during a third cycle while the first first-stage moulded part and the second first-stage moulded part cool in the cooling station; and
   wherein, after the third first-stage moulded part is cast in the first one of the at least two injection-moulding stations during the third cycle, the third first-stage moulded part is moved from the first one of the at least two injection-moulding stations to the cooling station, and a fourth first-stage moulded part is cast in the first one of the at least two injection-moulding stations during a fourth cycle while the first first-stage moulded part, the second first-stage moulded part, and the third first-stage moulded part cool in the cooling station.

19. The method according to claim 18, wherein each cycle includes an injection time and a cooling time within a respective one of the at least two injection-moulding stations.

20. The method according to claim 18, wherein said at least two injection-moulding processes comprise injection-moulding at least two layers of the injection-moulded part.

21. The method according to claim 18, wherein, after the fourth first-stage moulded part is cast in the first one of the at least two injection-moulding stations during the fourth cycle and is moved from the first one of the at least two injection-moulding stations to the cooling station, and after the first first-stage moulded part is moved from the cooling station to the second one of the at least two injection-moulding stations, a fifth first-stage moulded part is cast in the first one of the at least two injection-moulding stations during a fifth cycle while the second first-stage moulded part, the third first-stage moulded part, and the fourth first-stage moulded part cool in the cooling station, and while the second-stage moulded part is formed from the first first-stage moulded part in the second one of the at least two injection-moulding stations.

* * * * *